United States Patent
Hauth

[15] 3,642,101
[45] Feb. 15, 1972

[54] DISC BRAKES

[72] Inventor: Jean-Marc Hauth, Pont-A-Mousson, France

[73] Assignee: Centre de Recherches de Pont-A-Mousson, Pont-A-Mousson, France

[22] Filed: Mar. 31, 1970

[21] Appl. No.: 24,137

[30] Foreign Application Priority Data

Apr. 4, 1969    France..................................6910408

[52] U.S. Cl............................188/73.3, 188/73.5, 192/70.17
[51] Int. Cl.......................................................F16d 65/02
[58] Field of Search....................188/18 A, 71.1, 71.5, 73.2, 188/73.3, 73.5, 218 A; 192/70.17, 70.2

[56] References Cited

UNITED STATES PATENTS

| | | | |
|---|---|---|---|
| 1,933,176 | 10/1933 | Jonsson | 188/71.5 |
| 2,417,857 | 3/1947 | Barish | 188/73.2 X |
| 2,423,882 | 7/1947 | Frank | 188/71.5 |
| 2,581,941 | 1/1952 | Shinn et al. | 188/73.2 |
| 2,764,261 | 9/1956 | Bridges | 188/73.5 |

FOREIGN PATENTS OR APPLICATIONS 1,177,037   12/1958   France..................................188/18 A

*Primary Examiner*—Duane A. Reger
*Attorney*—J. Delattre-Seguy

[57] ABSTRACT

Disc brake having a drum secured to the wheel to be braked and a brake disc connected by keying arrangements to the drum so as to be axially slidable relative to, but driven by, the drum. Each keying arrangement comprises interengaging projecting portions and recesses provided on the drum and disc and having coacting faces contained in axial radial planes containing the axis of rotation of the disc. At least one spring strip, provided in each keying arrangement, is mounted on the drum or disc and has a free end resiliently bearing against the disc or drum so as to maintain the disc concentric with the drum.

8 Claims, 6 Drawing Figures

PATENTED FEB 15 1972 3,642,101
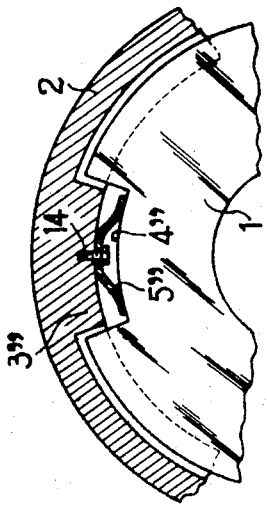
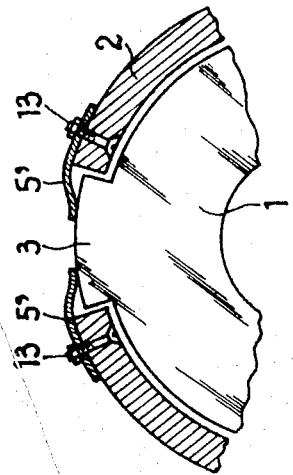
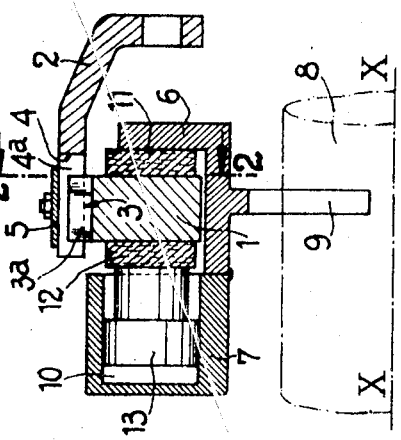
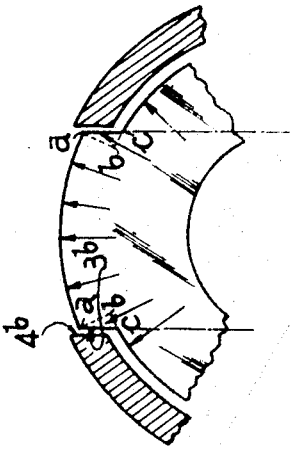
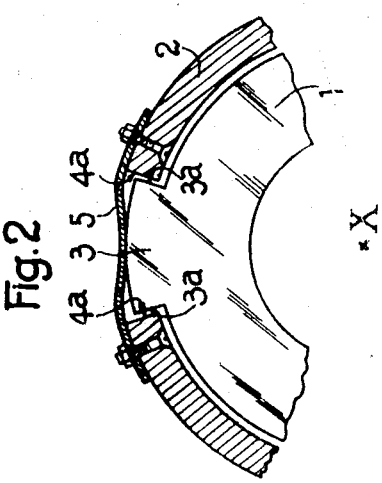
INVENTOR:
Jean-Marc HAUTH
by: J. Delattre-Seguy
Attorney

DISC BRAKES

The present invention relates to disc brakes having a floating disc and a fixed inner yoke for braking heavy vehicles, as trucks or busses, in which the floating disc is connected to a drum, secured to the wheel to be braked, by cooperating projecting portions and recesses having a keying function. When braking, the disc is gripped between shoes combined with a yoke and carrying the brake pads, one of the pads being fixed and the other movable and controlled by a piston and cylinder device.

In the known brakes of this type, the aforementioned cooperating projecting portions and recesses (tooth or rib and notch or groove) have lateral mutually contacting faces which are parallel to one another.

This results in serious drawbacks. Indeed, when braking, the disc heats whereas the drum substantially remains cool. The projecting portions having parallel faces of the disc (or drum) then become wedged in the corresponding recesses in the drum (or disc) owing to expansion of the disc. This prevents the disc from moving freely in a direction parallel to its axis of rotation so as to bear against the fixed brake pad. When the disc rotates with the brake unapplied, there is a continuous noise and the bearing faces are subjected to wear owing to the tapping of the faces of the recesses against the faces of the projecting portions performing the keying function.

The object of the invention is to remedy the aforementioned drawbacks.

The invention provides a disc brake of the aforementioned type comprising a drum secured to the wheel to be braked and a floating disc connected to rotate with the drum by a keying arrangement comprising cooperating projecting portions and recesses, the disc being slidable axially of the drum by the action of two brake pads which are adapted to grip the disc when braking and are located on each side of the disc, wherein the projecting portions and recesses of the keying arrangement have cooperating faces which are contained in radial planes containing the axis of rotation of the disc and at least one spring strip is fixed to the drum or to the disc and bears resiliently against the disc or the drum respectively in the region of each projecting portion and recess so as to maintain the disc resiliently centered relative to the axis of rotation of the drum.

With this arrangement, wedging between the projecting portions and the recesses owing to expansion of the disc and the aforementioned tapping are completely avoided and wear between the parts is much reduced.

Further features and advantages of the invention will be apparent from the ensuing description with reference to the accompanying drawing.

In the drawing:

FIG. 1 is a partial approximately radial sectional view of a brake according to the invention;

FIG. 2 is a partial sectional view, taken along line 2—2 of FIG. 1, of one arrangement for driving the disc by the drum;

FIG. 3 is a partial plan view of the arrangement shown in FIG. 2;

FIG. 4 is a diagrammatic view of a disc brake of known type, having pairs of parallel cooperating faces for the driving of the disc by the drum, the direction of the expansion of the disc being shown by arrows, and FIGS. 5 and 6 are sectional views, similar to FIG. 2, of two modifications according to the invention.

In the embodiment shown in FIGS. 1–3, the disc brake comprises a disc 1 which is free to move in a direction parallel to its axis of rotation X—X. The disc is driven in rotation by the drum 2, which is secured to the wheel to be braked, through an arrangement comprising projection portions 3 consisting of teeth equally and angularly spaced apart on the periphery of the disc and inserted, with provision of a slight circumferential clearance, in recesses, consisting of notches 4, in the drum 2. The teeth and the notches have their opposed and cooperating lateral faces $3^a$ and $4^a$ contained in radial axial planes containing the axis X—X of the disc. A spring disc-centering strip 5 is secured to the drum 2, spans each notch 4 and bears by its center portion against the corresponding tooth 3. Preferably, the strip 5 has a width exceeding the thickness of the disc 1.

The brake also comprises at least one yoke or stirrup comprising two half-yokes 6 and 7. The half-yoke 6 is directly fixed to the axle 8 of the wheel by a half-ring 9. Provided in the other half-yoke 7, which is integral with the half-yoke 6, is a brake-actuating servo or piston and cylinder device 10. A brake pad 11 is secured to the half-yoke 6 and another brake pad 12 is secured to the rod of the piston 13 of the device 10. The pads are parallel to the opposite faces of the disc 1.

The disc brake according to the invention operates in the following manner:

When the brake is unapplied, the disc 1, which is driven in rotation through the teeth 3 and clears the brake pads 11, 12 which are spaced away from the disc, is maintained concentric with the drum 2 by the action of the strips 5.

Upon braking, the brake pad 12, carried by the half-yoke 7, is made to bear, by the action of the piston 13 of the device 10, against the disc 1, which moves axially, and the disc 1 is gripped between the pad 12 and the fixed pad 11 and thus stops rotation of the drum 2 and the associated wheel.

The main advantages afforded by the invention are:

When braking, the disc 1 is heated by the rubbing of the pads 11, 12 thereagainst whereas the drum 2 is heated only by radiation or heat exchange along the contacting faces $3^a$ and $4^a$ of the teeth 3 and notches 4. Consequently, the disc 1 expands much more than the drum 2. The fact that the teeth 3 and the notches 4 have cooperating opposed faces $3^a$ and $4^a$ contained in radial axial planes containing the axis X—X of the disc, allows the disc to expand radially without wedging of the teeth 3 in the notches 4.

In a disc brake of known type, shown in FIG. 4, which has parallel cooperating drive faces $3^b$, $4^b$, the radial expansion of the disc (see arrows) results in the two triangular zones abc of the teeth of the disc expanding also radially and these parts abc of the teeth cause the disc to become wedged in the drum.

When the disc 1 rotates without applying the brake, the spring strips 5 maintain the disc concentric with the drum and thereby prevent the teeth from tapping against the notches and avoids abnormal wear of the cooperating faces of the teeth and notches.

According to a modification of the invention shown in FIG. 5, the single spring strip 5, which was, in the embodiment just described, secured to the drum 2 in the region of each tooth, is replaced by two spring strips 5'. Each of the latter is secured to the drum 2 at 13, extends as a cantilever spring and resiliently bears against the tooth or the bottom of the notch in the disc.

In the modification of the invention shown in FIG. 6, the disc 1 has notches 4" and the drum 2 has teeth 3". A spring strip 5" is radially interposed between the tooth and the notch and secured in its center part at 14 to the tooth of the drum 2 and bears at its ends against the bottom of the notch in the disc.

Note that there could be used, as in the embodiment shown in FIG. 5, two spring strips which are secured to the tooth 3" (or to the bottom of the notch 4") and bear in cantilever fashion against the bottom of the notch (or against the tooth).

Having now described my invention what I claim and desire to secure by Letters Patent is:

1. A disc brake for a wheel comprising a first element constituting a rotatable drum having an axis of rotation adapted to be secured to the wheel to be braked, a second element constituted by a floatable disc coaxial with and slidable relative to the drum in a direction parallel to said axis, a plurality of circumferentially spaced keying means connecting the disc to the drum so that the disc rotates with the drum, each keying means comprising a projecting portion provided on one of said elements and a recess provided on the other of said elements, said projecting portion extending radially into said recess, two brake pads located on opposite sides of the disc and means for urging the pads against the disc and braking the disc, each projecting portion being circumferentially defined by two end faces and each recess being circumferentially defined by two end faces which define circumferential clearance with said end faces of the corresponding projection, and at least one spring strip associated with each keying means, each spring strip having one portion secured to one of said elements and having another portion in resiliently abutting relation to the other of said elements in a region of said other element in radial alignment with said keying means, whereby the disc is resiliently maintained concentric with the drum.

2. A disc brake for a wheel comprising a first element constituting a rotatable drum having an axis of rotation adapted to be secured to the wheel to be braked, a second element constituted by a floatable disc coaxial with and slidable relative to the drum in a direction parallel to said axis, a plurality of circumferentially spaced keying means connecting the disc to the drum so that the disc rotates with the drum, each keying means comprising a projecting portion provided on one of said elements and a recess provided on the other of said elements, said projecting portion extending radially into said recess, two brake pads located on opposite sides of the disc and means for urging the pads against the disc and braking the disc, each projecting portion being circumferentially defined by two end faces and each recess being circumferentially defined by two end faces which define circumferential clearance with said end faces of the corresponding projection, said end faces of said projecting portions and of said recesses being contained in radial planes containing said axis, and at least one spring strip associated with each keying means, each spring strip having one portion secured to one of said elements and having another portion in resiliently abutting relation to the other of said elements in a region of said other element in radial alignment with said keying means, whereby the disc is maintained concentric with the drum.

3. A disc brake for a wheel comprising a first element constituting a rotatable drum having an axis of rotation adapted to be secured to the wheel to be braked, a second element constituted by a floatable disc coaxial with and slidable relative to the drum in a direction parallel to said axis, a plurality of circumferentially spaced keying means connecting the disc to the drum so that the disc rotates with the drum, each keying means comprising a projecting portion provided on one of said elements and a recess provided on the other of said elements, said projecting portion extending radially into said recess, two brake pads located on opposite sides of the disc and means for urging the pads against the disc and braking the disc, each projecting portion being circumferentially defined by two end faces and each recess being circumferentially defined by two end faces which define circumferential clearance with said end faces of the corresponding projection, said end faces of said projecting portions and of said recesses being contained in radial planes containing said axis, and at least one spring strip associated with each keying means, each spring strip having one portion secured to one of said elements and having another portion in resiliently abutting relation to the other of said elements in a region of said other element in radial alignment with said keying means, whereby the disc is maintained concentric with the drum.

4. A disc brake for a wheel comprising a first element constituting a rotatable drum having an axis of rotation adapted to be secured to the wheel to be braked, a second element constituted by a floatable disc coaxial with and slidable relative to the drum in a direction parallel to said axis, a plurality of circumferentially spaced keying means connecting the disc to the drum so that the disc rotates with the drum, each keying means comprising a projecting portion provided on one of said elements and a recess provided on the other of said elements, said projecting portion extending radially into said recess, two brake pads located on opposite sides of the disc and means for urging the pads against the disc and braking the disc, each projecting portion being circumferentially defined by two end faces and each recess being circumferentially defined by two end faces which define circumferential clearance with said end faces of the corresponding projection, said end faces of said projecting portions and of said recesses being contained in radial planes containing said axis, the drum being provided with said recesses and the disc being provided with said projecting portions, each spring strip having two end portions fixed to a periphery of the drum circumferentially on each side of the corresponding recess and a center portion in resiliently bearing relation to the corresponding projecting portion of the disc which extends into said recess.

5. A disc brake for a wheel comprising a first element constituting a rotatable drum having an axis of rotation adapted to be secured to the wheel to be braked, a second element constituted by a floatable disc coaxial with and slidable relative to the drum in a direction parallel to said axis, a plurality of circumferentially spaced keying means connecting the disc to the drum so that the disc rotates with the drum, each keying means comprising a projecting portion provided on one of said elements and a recess provided on the other of said elements, said projecting portion extending radially into said recess, two brake pads located on opposite sides of the disc and means for urging the pads against the disc and braking the disc, each projecting portion being circumferentially defined by two end faces and each recess being circumferentially defined by two end faces which define circumferential clearance with said end faces of the corresponding projection, said end faces of said projecting portions and of said recesses being contained in radial planes containing said axis, the drum being provided with said recesses and the disc being provided with said projecting portions, two spring strips being fixed to the drum on each side of each recess, said strips extending in cantilever fashion from the drum and having free end portions which are in resiliently bearing relation to the corresponding projecting portion of the disc.

6. A disc brake for a wheel comprising a fist element constituting a rotatable drum having an axis of rotation adapted to be secured to the wheel to be braked, a second element constituted by a floatable disc coaxial with and slidable relative to the drum in a direction parallel to said axis, a plurality of circumferentially spaced keying means connecting the disc to the drum so that the disc rotates with the drum, each keying means comprising a projecting portion provided on one of said elements and a recess provided on the other of said elements, said projecting portion extending radially into said recess, two brake pads located on opposite sides of the disc and means for urging the pads against the disc and braking the disc, each projecting portion being circumferentially defined by two end faces and each recess being circumferentially defined by two end faces which define circumferential clearance with said end faces of the corresponding projection, said end faces of said projecting portions and of said recesses being contained in radial planes containing said axis, the disc being provided with said recesses and the drum being provided with said projecting portions, a spring strip being radially interposed between each projecting portion and the corresponding recess, the strip having a center portion fixed to the projecting portion and free end portions in resiliently bearing relation to a bottom face of the corresponding recess of the disc.

7. A disc brake for a wheel comprising a first element constituting a rotatable drum having an axis of rotation adapted to be secured to the wheel to be braked, a second element constituted by a floatable disc coaxial with and slidable relative to the drum in a direction parallel to said axis, a plurality of circumferentially spaced keying means connecting the disc to the drum so that the disc rotates with the drum, each keying means comprising a projecting portion provided on one of said elements and a recess provided on the other of said elements, said projecting portion extending radially into said recess, two brake pads located on opposite sides of the disc and means for urging the pads against the disc and braking the disc, each projecting portion being circumferentially defined by two end faces and each recess being circumferentially defined by two end faces which define circumferential clearance with said end faces of the corresponding projection, said end faces of said projecting portions and of said recesses being contained in radial planes containing said axis, the disc being provided with said recesses and the drum being provided with said projecting portions, two spring strips being provided for each projecting portion, each spring strip having one end portion fixed to said projecting portion and a free end portion extending in cantilever fashion from the fixed end portion of the strip and in resiliently bearing relato a bottom face of the corresponding recess of the disc.

8. A disc brake as claimed in claim 3, wherein said strips have a width exceeding the thickness of the disc.

* * * * *